UNITED STATES PATENT OFFICE.

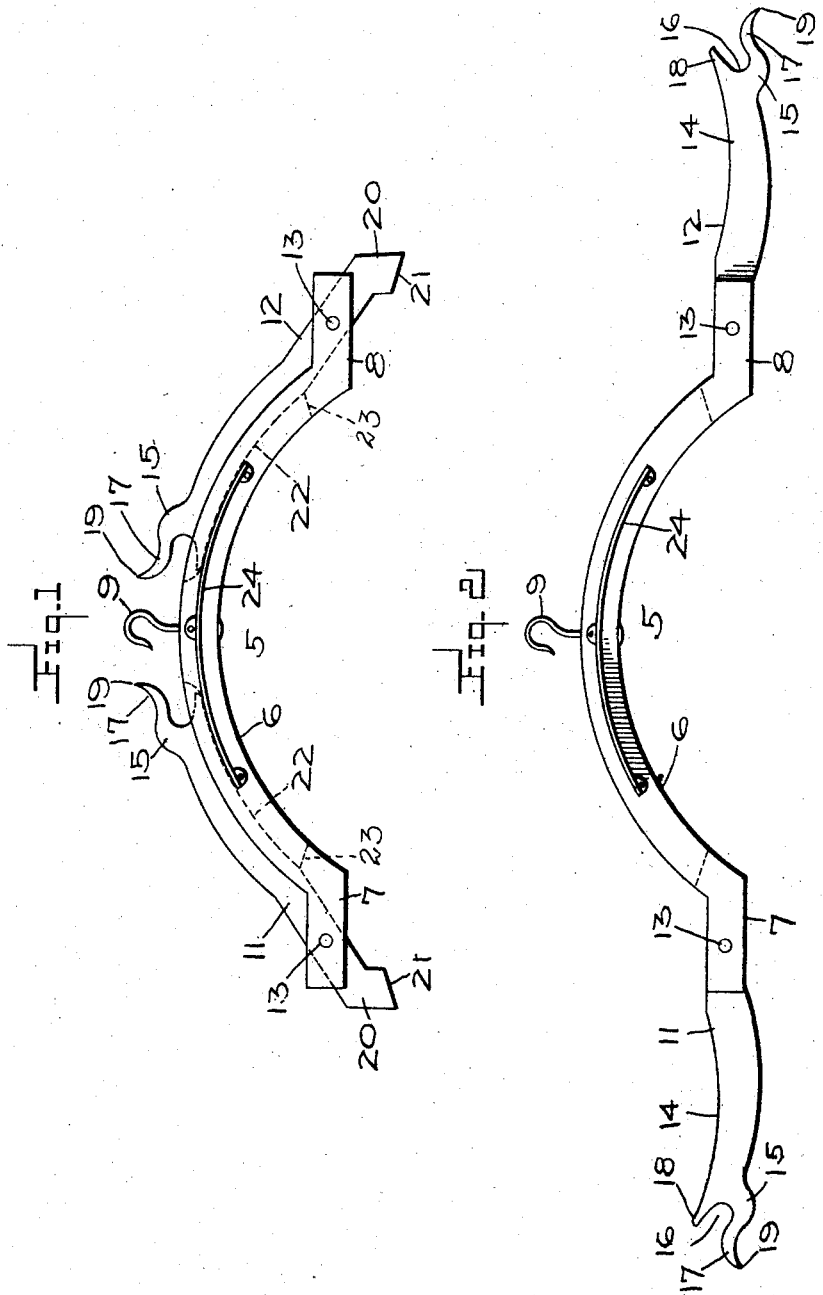

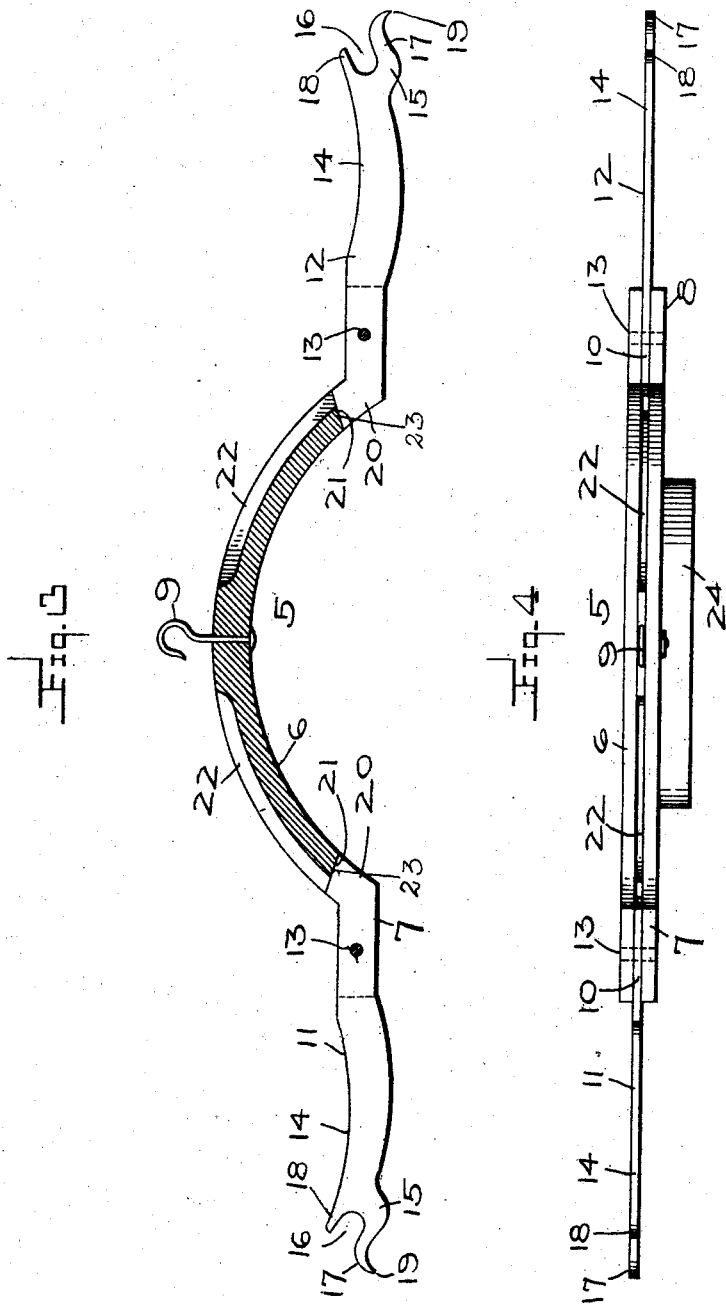

PERRY L. BROOKS, OF WASHINGTON COUNTY, KANSAS.

HOG-GAMBREL.

No. 901,947.　　　Specification of Letters Patent.　　　Patented Oct. 27, 1908.

Application filed March 6, 1908. Serial No. 419,521.

*To all whom it may concern:*

Be it known that I, PERRY L. BROOKS, a citizen of the United States, residing at R. F. D. No. 5, Box 83, in the county of Washington and State of Kansas, have invented certain new and useful Improvements in Hog-Gambrels, of which the following is a specification.

This invention relates to the class of butchering, and more particularly to hog or animal gambrels, and has for an object to provide a device of this character whereby carcasses of animals may be spread and conveniently hung while being cut for market.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views.

Figure 1 is a side elevational view of the gambrel showing the same in its closed position, Fig. 2 is a similar view showing the same in an unfolded position, Fig. 3 is a central longitudinal sectional view, Fig. 4 is a top plan view.

Referring now more particularly to the drawings, there is shown a gambrel 5 preferably in the form of an arcuate member 6 having laterally extending portions 7 and 8 respectively at its ends, and a centrally located supporting hook 9. The portions 7 and 8 of the arcuate member are forked as shown at 10 and are arranged to receive therebetween arms 11 and 12 respectively pivoted between the walls of the forked portions as shown at 13. Each arm consists of a horizontally extending portion 14 arranged to lie at times outwardly of the forked portions of the member, and these portions are enlarged at their outer ends to form heads as shown at 15, and these heads are forked as shown at 16 to form a lower bill 17 and an upper bill 18. The lower bill 17 of each arm is pointed as shown at 19. Each arm inwardly of its pivot point is provided with an upwardly inclined portion 20 having a beveled inner end 21 for a purpose to be hereinafter described.

The arcuate member is provided upon its upper side and at each side of the supporting hook 9 with recessed portions 22 which are thus arranged to receive the outer portions of the arms 11 and 12 respectively as shown in Fig. 1 of the drawings. The beveled ends 21 of the arms are thus arranged for engagement with shoulders 23 whereby the arms are held against downward movement when the same are in their horizontal position. Located at one side of the arcuate member and extending outwardly therefrom there is shown a scraping knife 24.

In use, the bills 17 of the arms 11 and 12 respectively are engaged with the tendons of the animal's feet and the arms swung down to their horizontal position thus spreading the animal and materially aiding in the butchering of the same. The hook 9 may be supported in any convenient manner, and this hook effectively serves in pulling a hog or animal out of the scalding pan.

What is claimed is:

1. An animal gambrel comprising an arcuate member, a supporting hook carried thereby, the member having laterally extending forked ends, the member having recesses upon its upper side in communication with the opening between each of said forked ends, arms pivotally mounted between the forked ends and including portions arranged for movement to lie at times in the recesses, means for holding the arms at times in a horizontal position, and tendon receiving hooks carried by the arms.

2. An animal gambrel comprising an arcuate member having forked ends and recessed portions in communication with the opening between said forked ends, and tendon receiving arms pivotally mounted between said ends and arranged to lie at times partly within said recessed portions.

3. An animal gambrel comprising an arcuate member having forked ends, shoulders carried by said member and extending between the forked ends, and tendon receiving arms pivotally mounted between the forked ends and having portions arranged for engagement at times with said shoulders to limit the outward movement of the arms.

In testimony whereof I affix my signature, in presence of two witnesses.

PERRY L. BROOKS.

Witnesses:
　HENRY L'ECUYER,
　ED MARCOUX.